(12) United States Patent
Siegmund

(10) Patent No.: US 9,776,307 B2
(45) Date of Patent: Oct. 3, 2017

(54) CLAMPING TOOL

(71) Applicant: Bernd Siegmund, Grossaitingen (DE)

(72) Inventor: Bernd Siegmund, Grossaitingen (DE)

(*) Notice: Subject to any disclaimer, the term of this patent is extended or adjusted under 35 U.S.C. 154(b) by 0 days.

(21) Appl. No.: 14/888,351

(22) PCT Filed: Jul. 12, 2014

(86) PCT No.: PCT/EP2014/001917
§ 371 (c)(1),
(2) Date: Oct. 30, 2015

(87) PCT Pub. No.: WO2015/018476
PCT Pub. Date: Feb. 12, 2015

(65) Prior Publication Data
US 2016/0059389 A1  Mar. 3, 2016

(30) Foreign Application Priority Data

Aug. 6, 2013 (DE) .................. 20 2013 007 011

(51) Int. Cl.
B23Q 3/02 (2006.01)
B25B 5/00 (2006.01)
(Continued)

(52) U.S. Cl.
CPC .......... B25B 5/006 (2013.01); B23K 37/0426 (2013.01); B23K 37/0435 (2013.01);
(Continued)

(58) Field of Classification Search
USPC .......................................... 269/100, 71, 73
See application file for complete search history.

(56) References Cited

U.S. PATENT DOCUMENTS 4,169,562 A   10/1979   Renzetti
4,867,427 A    9/1989   Cunningham
(Continued)

FOREIGN PATENT DOCUMENTS

CH   608 736 A5   1/1979
CN   1188036 A    7/1998
(Continued)

OTHER PUBLICATIONS

International Search Report issued by the European Patent Office in International Application PCT/EP2014/001917.
(Continued)

Primary Examiner — Larry E Waggle, Jr.
Assistant Examiner — Alvin Grant
(74) Attorney, Agent, or Firm — Henry M. Feiereisen LLC

(57) ABSTRACT

A clamping tool includes a strut having one end and defining a longitudinal axis. Arranged on the one end of the strut is a mount which includes a bushing that is arranged on the strut. The bushing includes recesses and a receptacle which interacts with the recesses so as to be rotatably mounted in the bushing. The bushing has an interior provided with at least one groove for receiving an O-ring which is sized to extend beyond the groove to inhibit a rotational mobility of the receptacle. A clamping device is received in the receptacle of the mount and configured to swing about an axis perpendicular to the longitudinal axis of the strut.

7 Claims, 5 Drawing Sheets

(51) Int. Cl.
   *B25B 5/10* (2006.01)
   *B25B 5/16* (2006.01)
   *B23K 37/04* (2006.01)

(52) U.S. Cl.
   CPC .......... *B25B 5/10* (2013.01); *B25B 5/102* (2013.01); *B25B 5/103* (2013.01); *B25B 5/16* (2013.01)

(56) References Cited

U.S. PATENT DOCUMENTS

| | | | | |
|---|---|---|---|---|
| 5,181,702 | A | * | 1/1993 | Pettigrew .......... B25B 5/102 269/166 |
| 5,318,284 | A | | 6/1994 | Demmeler et al. |
| 5,553,838 | A | * | 9/1996 | Lee .......... B25B 5/006 269/100 |
| 5,730,434 | A | * | 3/1998 | Schoene .......... B23D 47/04 269/249 |
| 6,079,703 | A | * | 6/2000 | Chavez, Jr. .......... B25B 5/068 269/147 |

FOREIGN PATENT DOCUMENTS

| | | |
|---|---|---|
| CN | 1671512 A | 9/2005 |
| DE | 90 15 218.2 U1 | 4/1991 |
| DE | 91 09 540.9 U1 | 10/1991 |
| DE | 296 08 556 U1 | 9/1996 |
| DE | 199 17 209 A1 | 11/2000 |
| DE | 100 11 490 A1 | 9/2001 |
| DE | 202 04 107 U1 | 8/2002 |
| DE | 202 12 731 U1 | 12/2002 |
| DE | 202 19 317 U1 | 3/2003 |
| DE | 200 23 552 U1 | 11/2004 |
| DE | 20 2009 016 323 U1 | 9/2010 |
| DE | 10 2009 022 013 A1 | 11/2010 |
| DE | 10 2010 041 568 A1 | 3/2012 |
| EP | 0 541 904 A1 | 5/1993 |
| GB | 2 192 826 A | 1/1988 |

OTHER PUBLICATIONS

Chinese Search Report issued on Dec. 21, 2016 with respect to Chinese counterpart Chinese patent application 201480017469.4.
English translation of Chinese Search Report issued on Dec. 21, 2016 with respect to Chinese counterpart Chinese patent application 201480017469.4.

* cited by examiner

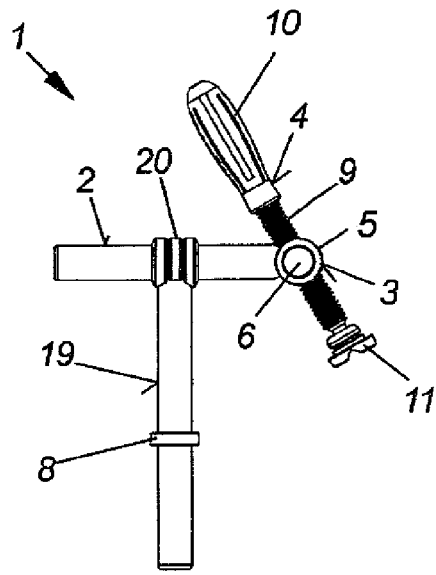
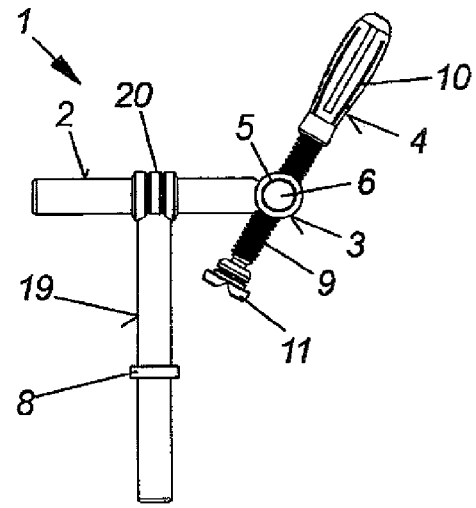
Fig. 15    Fig. 16
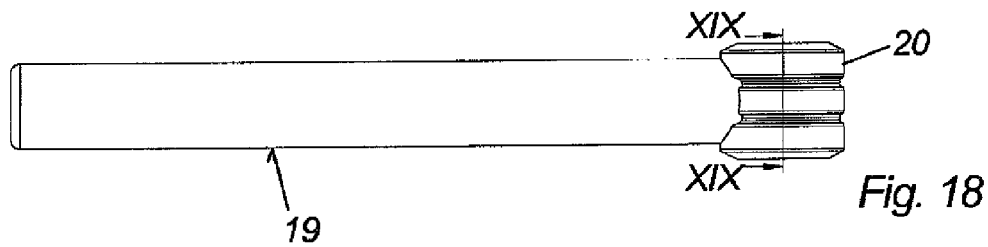
Fig. 18
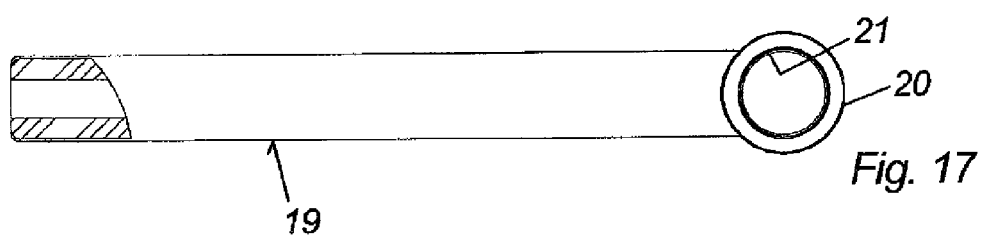
Fig. 17
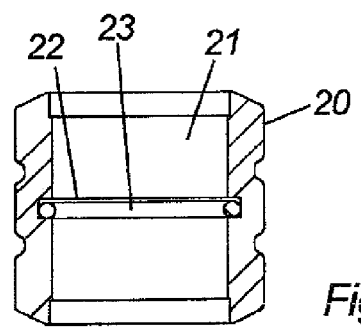
Fig. 19

CLAMPING TOOL

CROSS-REFERENCES TO RELATED APPLICATIONS

This application is the U.S. National Stage of International Application No. PCT/EP2014/001917, filed Jul. 12, 2014, which designated the United States and has been published as International Publication No. WO 2015/018476 and which claims the priority of German Patent Application, Serial No. 20 2013 007 011.0, filed Aug. 6, 2013, pursuant to 35 U.S.C. 119(a)-(d).

BACKGROUND OF THE INVENTION

The invention relates to a clamping tool including a strut having one end on which a mount for a clamping device is arranged, with the clamping device being swingable about an axis perpendicular to the longitudinal direction of the strut.

Such a clamping tool is known from DE 100 11 490 A1, in which a separate component for the clamping device is tiltable about an axis as a result of two axle stub screws engaging in bores of the separate component through the strut. In this way, damaging forces, which act against the wanted clamping, should be avoided. However, it is not possible to realize different directions in which the clamping device acts.

DE 10 2009 022 013 A1 describes another clamping tool, in which the direction, in which the clamping device acts, can be changed. For this purpose, a mount for the clamping device, engaging through the strut, can be fixed in various positions by a screw. However, to change the direction of the clamping device, it is required to loosen the screw, to adjust the desired position of the mount, and to tighten the screw again.

For example, such clamping tools are used in connection with welding tables with which objects can be clamped and welded or otherwise worked on. In addition, there are also a variety of other possible applications for welding tables, for example, to measure apparatuses or the like. Such welding tables are known, for example, from EP 0541904 A1 or DE 91 09 540 U1. Reference is made to the content of these publications, which content is expressly incorporated as subject matter of the present application.

Welding tables have in their surface and optionally also in side panels of the table plate a plurality of mostly round openings, which are arranged in a uniform grid dimension. In addition, welding tables have a wide range of accessories which render clamping of objects possible. This involves mostly angular supports, which also have round openings or also oblong openings. These supports can be connected with each other or with the welding table using clamps, like clamping bolts, which can comprise a threaded bolt with associated nut. In addition, clamping bolts find application which are inserted in the openings of the table from one side and supported within the opening or on the bottom side of the table plate. Besides the already mentioned publications, such clamping bolts are also known from DE 199 17 209 A1, DE 202 19 317 U1, to which content reference is made and incorporated as subject matter of the present application.

In addition, screw clamps are used as clamps in conjunction with welding tables and also provided to clamp objects. Such screw clamps can be found in addition to the already mentioned publications also in U.S. Pat. No. 4,867,427, DE 100 11 490 A1, DE 200 23 552 U1, DE 202 04 107 U1, DE 202 12 731 U1, DE 202 19 317 U1, DE 10 2009 022 013 A1, or in the form of quick-release clamps in DE 90 15 218 U1.

Also reference is made to the content of these publications and incorporated as subject matter of the present application.

As additional accessory, various stops with round openings and/or oblong openings and prisms are known.

SUMMARY OF THE INVENTION

The invention is based on the problem to provide a clamping tool, which can avoid displacing forces that impair the dimensional accuracy during clamping and at the same time is able to adjust different directions, in which the clamping device acts, in a simple manner.

This object is achieved by the features of the independent claim. Preferred configurations of the invention are set forth in the dependent claims.

In the clamping tool according to the invention, the mount includes a bushing arranged on the strut and having for the clamping device a receptacle which is rotatably mounted, wherein the bushing has at least one groove in its interior and recesses for the clamping device, and an O-ring, which is placed in the groove/grooves and slightly extends beyond the groove(s) to inhibit the rotational mobility of the receptacle. The clamping tool with its strut can be inserted in the openings of a welding table and then can apply with the clamping device a force on, for example, an arrangement to be welded. As a result, the strut is tilted in the opening during clamping. This will compensate any potential displacing forces which exceed the inhibiting effect of the O-ring/O-rings on the rotational mobility of the receptacle, so that the dimensional accuracy is not impaired during clamping. At the same time, it is possible to adjust the direction of operation of the clamping device within the limits of the recesses for the clamping device in the bushing by moving the clamping device and its receptacle in opposition to the inhibiting effect of the O-ring/O-rings on the mobility of the receptacle. For example, an adjustment range of +30° and −30° about the central position of the clamping device, i.e. overall 60°, is conceivable. As a result of the inhibiting effect of the O-ring/O-rings on the rotational mobility of the receptacle, it is ensured that the adjusted direction, in which the clamping device acts, is maintained and is not changed by gravity for example. The clamping tool has hereby a simple structure and is insensitive to rough handling or contamination, as it often occurs in practice.

Advantageously, there are two grooves, each with an O-ring, in the interior of the bushing, resulting in a uniform action of the desired inhibiting effect on the rotational mobility of the receptacle.

The rotational mobility of the receptacle for the clamping device in the bushing can be realized in an especially simple manner, when the receptacle is shaped cylindrically.

A further improvement of the applications of the clamping tool is realized, when additionally providing for the strut a vertical strut with a guide arranged at one end thereof. The guide can hereby have at least one groove within its interior and an O-ring in the groove/grooves, which slightly extends beyond the groove(s) to inhibit the rotational mobility and/or longitudinal shiftability of the strut. In such configurations of the invention, it is possible to insert the vertical strut in the openings of a welding table and the strut in the guide of the vertical strut so that a clamping in the direction of the welding table is rendered possible. The height of the strut above the table plate can be adjusted by different depth of inserting the vertical strut into the openings, and the distance of the clamping device from the vertical strut can be adjusted by different depth of inserting the strut in the guide of the vertical strut. At the same time, the adjustability with regard to the direction, in which the clamping device acts, is maintained.

A basic configuration of the clamping tool becomes apparent, when the strut and/or the vertical strut is/are formed from a round tube.

Using an adjustment ring adjustably arranged on the strut and/or the vertical strut, it becomes possible to adjust how deep the strut and/or the vertical strut penetrates into the opening of a welding table. The adjustment ring can have a groove within its interior and inside the groove an O-ring, which slightly extends beyond the groove and inhibits the longitudinal shiftability of the adjustment ring on the strut and/or on the vertical strut. A nearly full insertion and thus a shorter distance of the clamping device from the welding table is hereby possible, without having a disturbing part of the strut and/or the vertical strut projecting upwards.

A threaded spindle can be advantageously used as clamping device. In this case, the receptacle has a transverse internal thread, in which the external thread of the threaded spindle engages. The threaded spindle has typically a handle and a replaceable prism, so that the clamping tool can be disassembled in a simple manner by removing the prism and then unscrewing the threaded spindle out of the receptacle. The receptacle can then be removed from the bushing.

As an alternative, a quick-release clamping device can be used as clamping device.

BRIEF DESCRIPTION OF THE DRAWING

The invention will be described in greater detail with reference to the drawing. It is shown in.

DETAILED DESCRIPTION OF PREFERRED EMBODIMENTS

Figure 1:
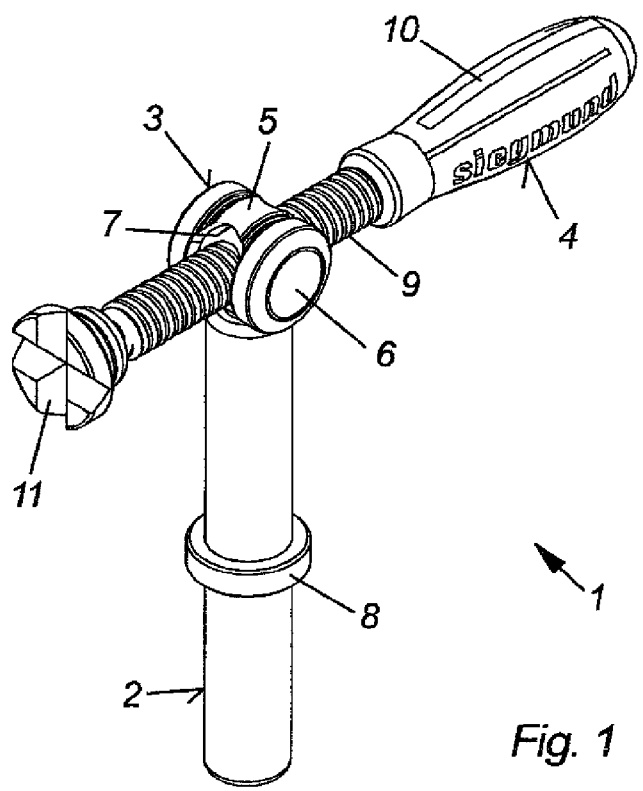
FIG. 1 a perspective view of a clamping tool.

FIGS. 1 to 4 show various views of a clamping tool 1.

The clamping tool 1 includes a strut 2, which is insertable in an opening, e.g. of a welding table, and is formed from a round tube. A tube of other cross section, a flat bar, or the like, can also be used.

Arranged at one end of the strut 2 is a mount 3 for a clamping device 4, with the clamping device 4 being swingable about an axis perpendicular to the longitudinal direction of the strut 2, as will be explained in greater detail hereinafter. The mount 3 includes a bushing 5 which is arranged on the strut 2 and in which a receptacle 6 is rotatably mounted. Moreover, the bushing 5 has recesses 7 for the clamping device 4. Further details of the bushing 5 and the receptacle 6 are explained with reference to FIGS. 5 to 8 and FIGS. 9 to 11.

Arranged on the strut 2 is an adjustment ring 8 for longitudinal movement. Using the adjustment ring 8, the depth of inserting the strut 2 into the opening can be changed. This adjustment ring 8 is not absolutely required for the function of the clamping tool 1. Further details of the adjustment ring 8 are explained with reference to FIGS. 12 and 13.

A threaded spindle 9 as clamping device 4 is swingable in the mount 3 about an axis perpendicular to the longitudinal direction of the strut 2. For this purpose, the rotatably mounted receptacle 6 has a transverse internal thread in which the external thread of the threaded spindle 9 engages. Instead of the threaded spindle 9, a quick-release clamping device or another clamping mechanism can be used. The threaded spindle 9 has a handle 10 and a replaceable prism 11.

Figure 2:
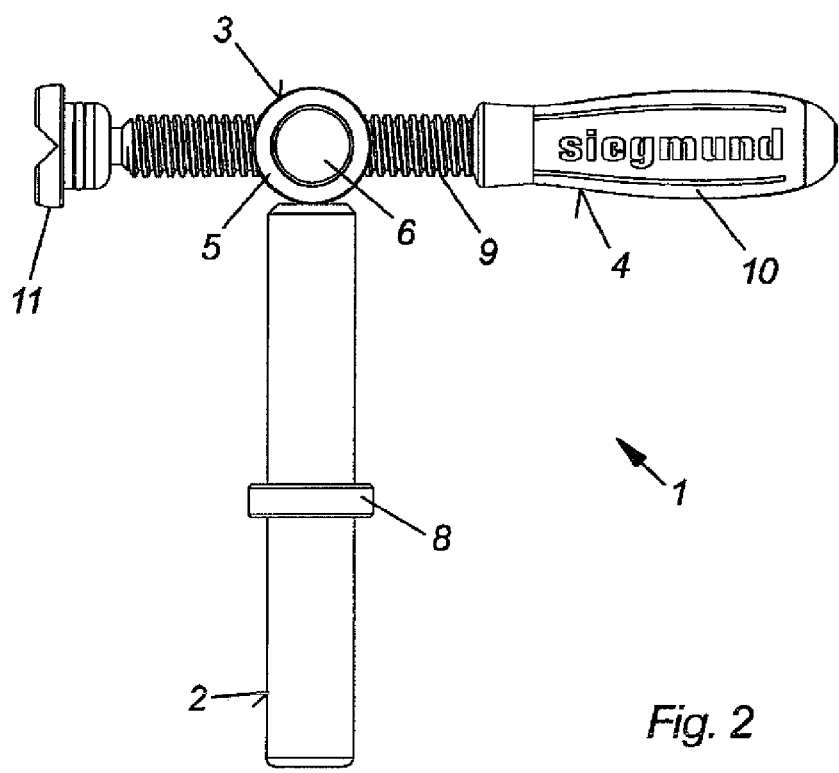
FIGS. 2 to 4 side views of the clamping tool in various directions, in which the clamping device acts, FIGS. 5 and 6 various views of the strut of the clamping tool, FIG. 7 an enlarged sectional view taken along the line VII-VII of FIG. 6, FIG. 8 an enlarged sectional view shown taken along the line VIII-VIII of FIG. 6, FIGS. 9 to 11 various views of the receptacle of the clamping tool, FIG. 12 an adjustment ring of the clamping tool on an enlarged scale, FIG. 13 a sectional view taken along the line XIII-XIII of FIG. 12, FIGS. 14 to 16 side views of the clamping tool with a vertical strut in different directions, in which the clamping device acts, FIGS. 17 and 18 various views of the vertical strut of the clamping tool, and FIG. 19 an enlarged section taken along the line XIX-XIX of FIG. 18.
Figure 3:
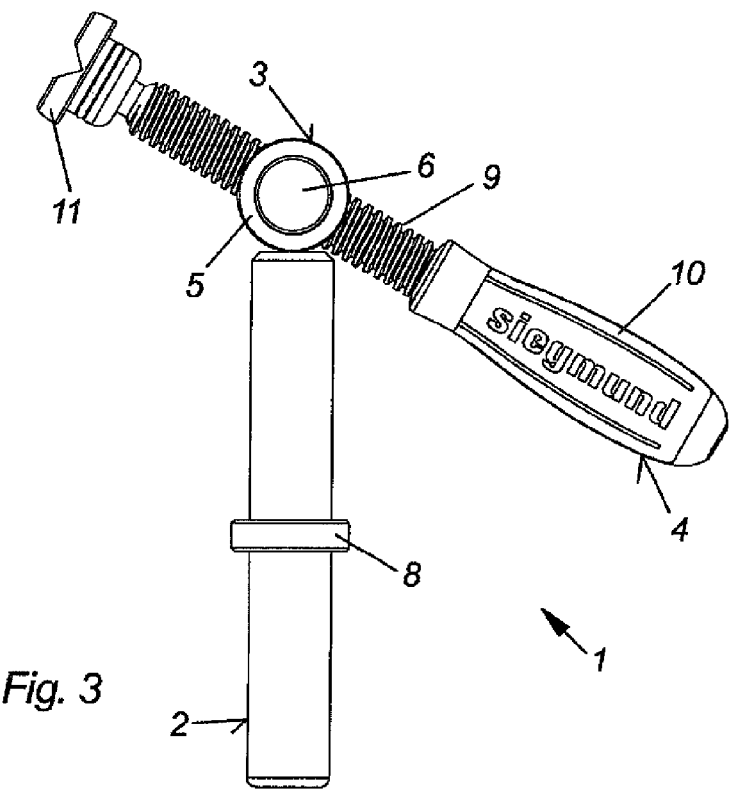
Figure 4:
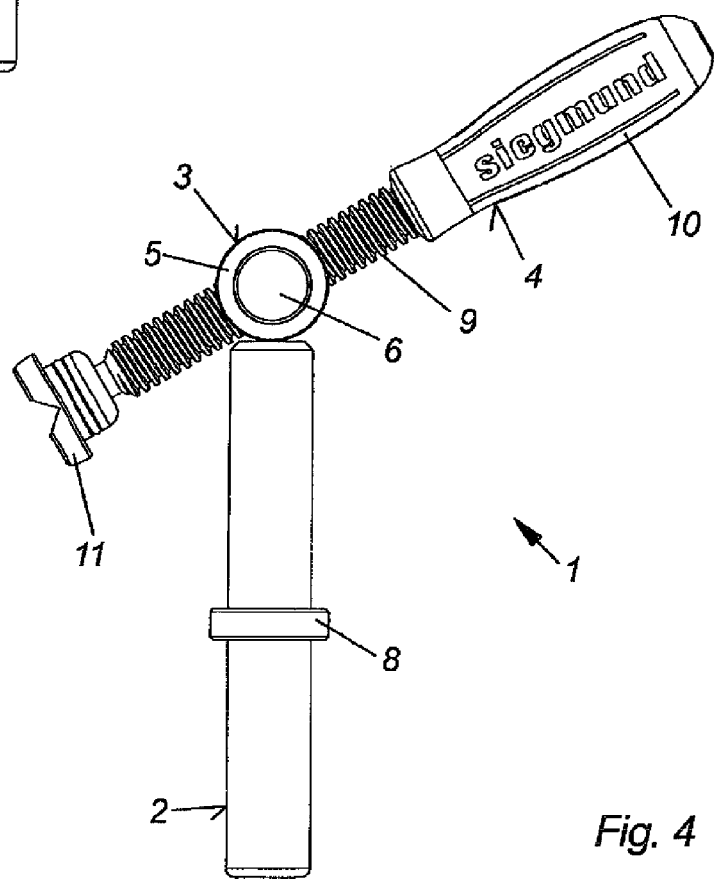
Figure 6:
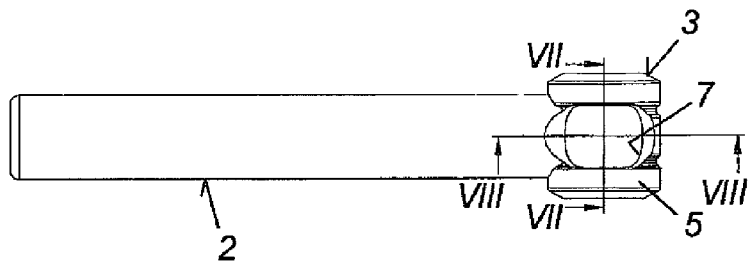
Figure 5:
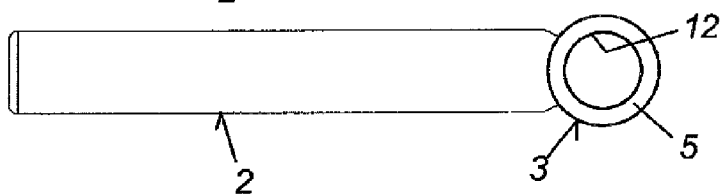
Figure 7:
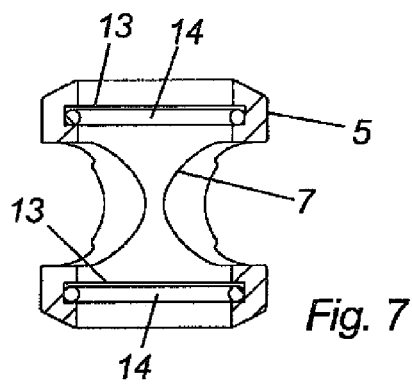
Figure 8:
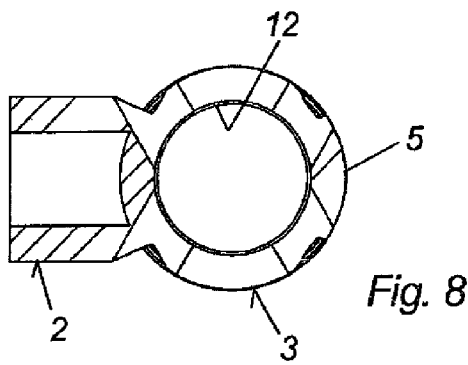

With reference to FIGS. 2 to 4, it becomes apparent that the direction, in which the clamping device 4 acts, can be adjusted in the bushing 5 within the dimensions of the receptacle 7, by rotating the clamping device 4 with the receptacle 6 inside the bushing 5.

The clamping tool 1 can be disassembled in a simple manner by removing the prism 11 and unscrewing the threaded spindle 9 out of the receptacle 6. The receptacle 6 can then be removed from the bushing 5. The structure of the strut 2 and particularly the bushing 5 is explained in greater detail with reference to FIGS. 6 to 8.

A mount 3 is arranged at one end of the strut 2 and includes a bushing 5 with recesses 7. The bushing 5 has in its interior 2 two grooves 13, in each of which there is an O-ring 14 which slightly extends beyond the grooves 13. The O-rings 14 inhibit the rotational mobility of the receptacle 6 in the bushing 5, without preventing it completely. It will be understood that the presence of a single groove 13 with an O-ring 14 is also possible, or further grooves 13 with O-rings 14 can be provided.

Figure 9:
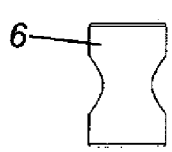
Figure 10:
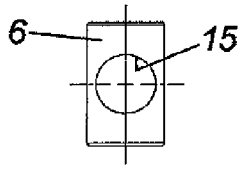
Figure 11:
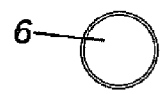

The structure of the receptacle 6 is explained in greater detail with reference to FIGS. 9 to 11

The receptacle 6 is shaped cylindrically to realize a rotational mobility inside the bushing 5 in a simple manner. The receptacle 6 has an internal thread 15, which extends transversely to the longitudinal direction and into which the external thread of the threaded spindle 9 can engage.

Figure 12:
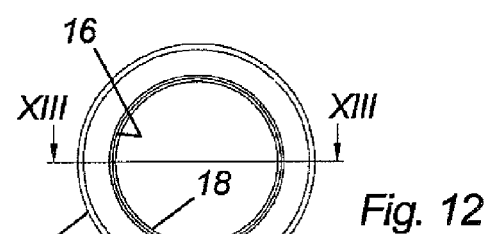
Figure 13:
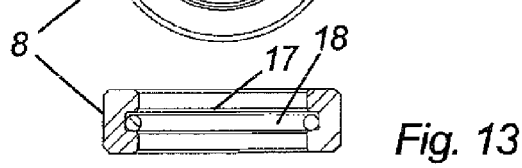

The adjustment ring 8 is explained in greater detail with reference to FIGS. 12 and 13.

The adjustment ring 8 has in its interior 16 a groove 17, in which an O-ring 18 is located and extends slightly beyond the groove 17. The O-ring 18 inhibits the longitudinal shiftability of the adjustment ring 8 on the strut 2 without preventing it completely.

Figure 14:
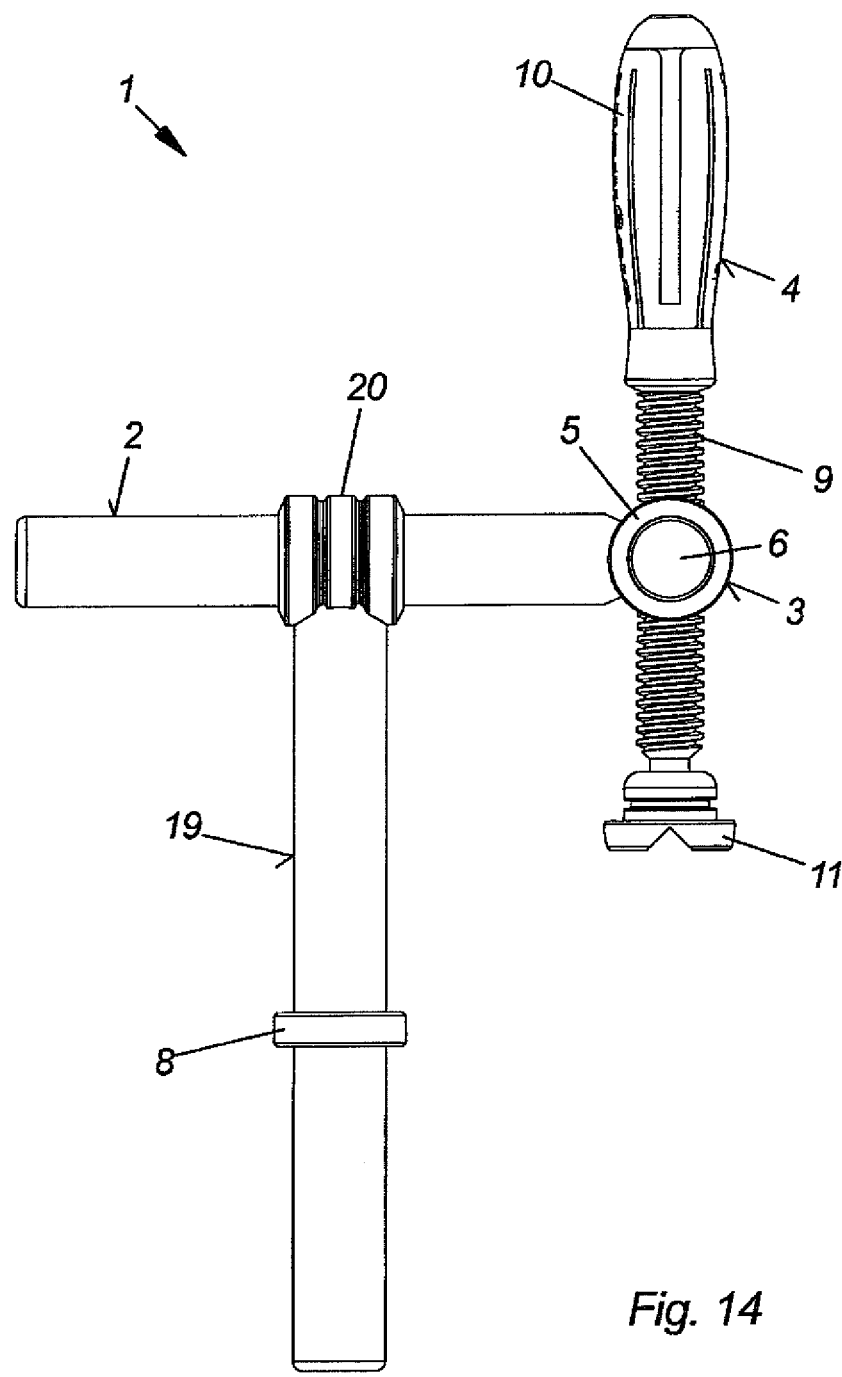

In the clamping tool 1, shown in FIGS. 14 to 16, the strut 2 is inserted in a guide 20, which is arranged at one end of a vertical strut 19. Further details of the guide 20 are explained with reference to FIGS. 17 to 19.

The vertical strut 19 is insertable in an opening, e.g. of a welding table, and is formed from a round tube. A tube of other cross section, a flat bar, or the like, can also be used. The embodiment of FIGS. 14 to 16 thus renders possible a clamping in the direction of the table plate. The height of the strut 2 from the table plate can hereby be adjusted by a different depth of inserting the vertical strut 19 into the openings, and the distance of the clamping device 4 from the vertical strut 19 can be changed by inserting the strut 2 in the guide 20 of the vertical strut 19 at different depths. At the same time, the adjustability regarding the direction, in which the clamping device 4 acts, is maintained.

Arranged on the vertical strut 19 for longitudinal movement is an adjustment ring 8. Using the adjustment ring 8, the depth of inserting the vertical strut 19 in the opening can be changed. This adjustment ring 8 is not absolutely required for the function of the clamping tool 1. Further details of the adjustment ring 8 are explained with reference to FIGS. 12 and 13.

The structure of the vertical strut 19 and particularly the guide 20 are explained in greater detail with reference to FIGS. 17 to 19.

Arranged at one end of the vertical strut 19 is the guide 20. In its interior 21, the guide 20 has a groove 22 in which an O-ring 23 is located and extends slightly beyond the groove 22. The O-ring 23 inhibits the rotational mobility and/or longitudinal shiftability of the strut 2 in the guide 20 without preventing it completely. It is to be understood that further grooves 22 with O-rings 23 could also be provided.

The use of the clamping tool 1 is not limited to the described welding table, but can be used wherever the clamping tool 1 is insertable with its strut 2 and/or its vertical strut 19 into openings.

What is claimed is:

1. A clamping tool, comprising:
    a strut having one end and defining a longitudinal axis;
    a mount arranged on the one end of the strut, said mount including a bushing which is arranged on the strut said bushing including recesses and a receptacle interacting with the recesses so as to be rotatably mounted in the bushing, said bushing having an interior provided with at least one groove:
    an O-ring placed in the groove and sized to extend beyond the groove to inhibit a rotational mobility of the receptacle;
    wherein the interior of the bushing has two of said groove, each receiving an O-ring;
    a clamping device received in the receptacle of the mount and configured to swing about an axis perpendicular to the longitudinal axis of the strut; and
    a vertical strut having one end and a guide arranged on the one end of the vertical strut, said strut being insertable in the guide.

2. The clamping tool of claim 1, wherein the receptacle has a cylindrical shape.

3. The clamping tool of claim 1, wherein the guide has an interior provided with at least one groove, and further comprising an O-ring placed inside the groove of the guide and sized to extend beyond the groove of the guide to inhibit a rotational mobility or longitudinal shiftability of the strut in the guide.

4. The clamping tool of claim 3, wherein at least one of the strut and the vertical strut is formed from a round tube.

5. The clamping tool of claim 1, further comprising an adjustment ring arranged on a member selected from the group consisting of the strut and the vertical ring, said adjustment ring having an interior provided with a groove for placement of an O-ring sized to extend beyond the groove of the adjustment ring to inhibit a longitudinal mobility of the adjustment ring on the member.

6. The clamping tool of claim 1, wherein the clamping device is constructed in the form of a threaded spindle with an external thread, said receptacle having a transverse internal thread for engagement of the external thread of the threaded spindle.

7. The clamping tool of claim 1, wherein the clamping device is constructed in the form of a quick-release clamping device.

* * * * *